United States Patent
Slone et al.

(10) Patent No.: US 9,757,690 B2
(45) Date of Patent: Sep. 12, 2017

(54) REACTOR APPARATUS AND METHOD FOR REDUCING NOX FROM EXHAUST GASES PRODUCED BY INDUSTRIAL PROCESSES

(71) Applicant: NoxTech, Inc., Costa Mesa, CA (US)

(72) Inventors: Ralph Slone, Columbus, IN (US); Arthur Scott Blacklock, San Diego, CA (US)

(73) Assignee: NoxTech, Inc., Costa Mesa, CA (US)

( * ) Notice: Subject to any disclaimer, the term of this patent is extended or adjusted under 35 U.S.C. 154(b) by 295 days.

(21) Appl. No.: 14/618,341

(22) Filed: Feb. 10, 2015

(65) Prior Publication Data

US 2016/0228816 A1 Aug. 11, 2016

(51) Int. Cl.
*B01D 50/00* (2006.01)
*B01D 53/92* (2006.01)
*B01D 53/34* (2006.01)
*F01N 3/20* (2006.01)
*F02G 5/00* (2006.01)

(52) U.S. Cl.
CPC ......... *B01D 53/925* (2013.01); *B01D 53/343* (2013.01); *B01D 53/346* (2013.01); *F01N 3/2033* (2013.01); *F02G 5/00* (2013.01); *F01N 2240/02* (2013.01); *F01N 2240/12* (2013.01); *F01N 2470/18* (2013.01); *F01N 2610/03* (2013.01); *F01N 2900/0408* (2013.01); *F01N 2900/1404* (2013.01)

(58) Field of Classification Search
CPC .. F01N 3/0205; F01N 13/008; F01N 2470/18; F01N 2900/1404; B01D 53/925

USPC ............. 422/173, 176, 182, 183; 431/5, 12; 110/185–190

See application file for complete search history.

(56) References Cited

U.S. PATENT DOCUMENTS

| | | | | |
|---|---|---|---|---|
| 3,604,824 A | * | 9/1971 | Hardison | F26B 23/022 34/633 |
| 3,815,523 A | * | 6/1974 | Gibeault | F23G 5/14 110/204 |
| 4,850,857 A | * | 7/1989 | Obermuller | F23G 7/066 422/203 |
| 5,985,222 A | | 11/1999 | Sudduth et al. | |
| 2001/0046649 A1 | * | 11/2001 | Schutz | F23C 6/047 431/4 |

* cited by examiner

*Primary Examiner* — Tom P Duong
(74) *Attorney, Agent, or Firm* — George Pappas

(57) ABSTRACT

A reactor apparatus and method for removing and/or reducing NOx, CO, carbon particulates and hydrocarbons from exhaust gases produced by industrial processes includes a reactor including an inlet plenum, a reaction chamber, an outlet plenum, and a heat exchanger wherein gases exiting the reaction chamber heat gases entering the reaction chamber. EGR is drawn through a cooling heat exchanger with an injection blower and is delivered through control valves to the reaction chamber, the inlet plenum and to an add fuel mixing chamber whereby mixed fuel and EGR is delivered to the reaction chamber. A feedback controller controls the flow valves responsive to the temperatures in the reaction chamber entrance and the outlet plenum.

22 Claims, 2 Drawing Sheets

REACTOR APPARATUS AND METHOD FOR REDUCING NOX FROM EXHAUST GASES PRODUCED BY INDUSTRIAL PROCESSES

BACKGROUND OF THE INVENTION

1. Field of the Invention

The present invention relates to the field of apparatus and methods which remove and/or reduce NOx, CO, carbon particulates and hydrocarbons from exhaust gases produced by industrial processes and, more particularly, from exhaust gases produces by hydrocarbon internal combustion engines.

2. Background

Reactor apparatus for removing and/or reducing NOx, CO, carbon particulates and hydrocarbons from exhaust gases produced by industrial processes are today well know and commonly used. One such prior reactor and method of use thereof is shown and described in Sudduth et al., U.S. Pat. No. 5,985,222. Although that reactor and method function well for the intended purpose, there is a need and desire to improve the reactor operation and efficiency and to achieve yet further removal and/or reduction of NOx, CO, carbon particulates and hydrocarbons from the exhaust gases produced by industrial processes.

SUMMARY OF THE INVENTION

The reactor apparatus and method of the present invention improves the operation and efficiency and achieves further removal and/or reduction of NOx, CO, carbon particulates and hydrocarbons from the exhaust gases than that of Sudduth et al., U.S. Pat. No. 5,985,222, the disclosure of which is hereby incorporated by reference.

In one form thereof the present invention is directed to an apparatus for treating exhaust gases produced by industrial processes and removing or reducing NOx, CO, carbon particulates and hydrocarbons therefrom. The apparatus includes a reactor including: an inlet plenum receiving the exhaust gases; a reaction chamber wherein a reaction takes place for treating the exhaust gases; an outlet plenum receiving the treated exhaust gases; a heat exchanger including a first exchanger chamber between the inlet plenum and an entrance to the reaction chamber and a second exchanger chamber between an exit from the reaction chamber and the outlet plenum and wherein exhaust gases exiting the reaction chamber and traveling through the second exchanger chamber and to the outlet plenum are used to heat the exhaust gases traveling from the inlet plenum through the first exchanger chamber and entering the reaction chamber. The treated exhaust gas can be recirculated from the outlet plenum to the reaction chamber entrance.

Preferably the apparatus includes a mixing chamber comprising a plurality of swirl vanes between the heat exchanger first chamber and the reaction chamber entrance. A reductant is injected into the mixing chamber, and a burner selectively provides heat through the mixing chamber and into the reaction chamber.

The apparatus further preferably includes an injection blower between the outlet plenum and the reaction chamber whereby treated exhaust gas is recirculated from the outlet plenum and is injected into the reaction chamber. A first flow valve is provided between the injection blower and the reaction chamber. An add fuel dilution mixer is provided between the injection blower and the reaction chamber. An add fuel control unit provides hydrocarbon add fuel to the add fuel dilution mixer whereby mixed recirculated exhaust gases and add fuel is injected into the reaction chamber. A second flow control valve is provided between the injection blower and the add fuel dilution mixer. A third flow valve is provided between the injection blower and the inlet plenum whereby treated exhaust gas is recirculated from the outlet plenum and is injected into the inlet plenum. A feedback controller is provided and a heat sensor connected to the feedback controller provides an input temperature value to the controller of the exhaust gases in the outlet plenum, and a heat sensor connected to the feedback controller provides an input temperature value to the controller of the recirculated exhaust gases entering the reaction chamber. The feedback controller in connected to and controls the first, second and third flow valves in response to the input temperatures values. A cooling heat exchanger is provided between the outlet plenum and the injection blower for cooling the treated exhaust gas being recirculated from the outlet plenum to the input plenum.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
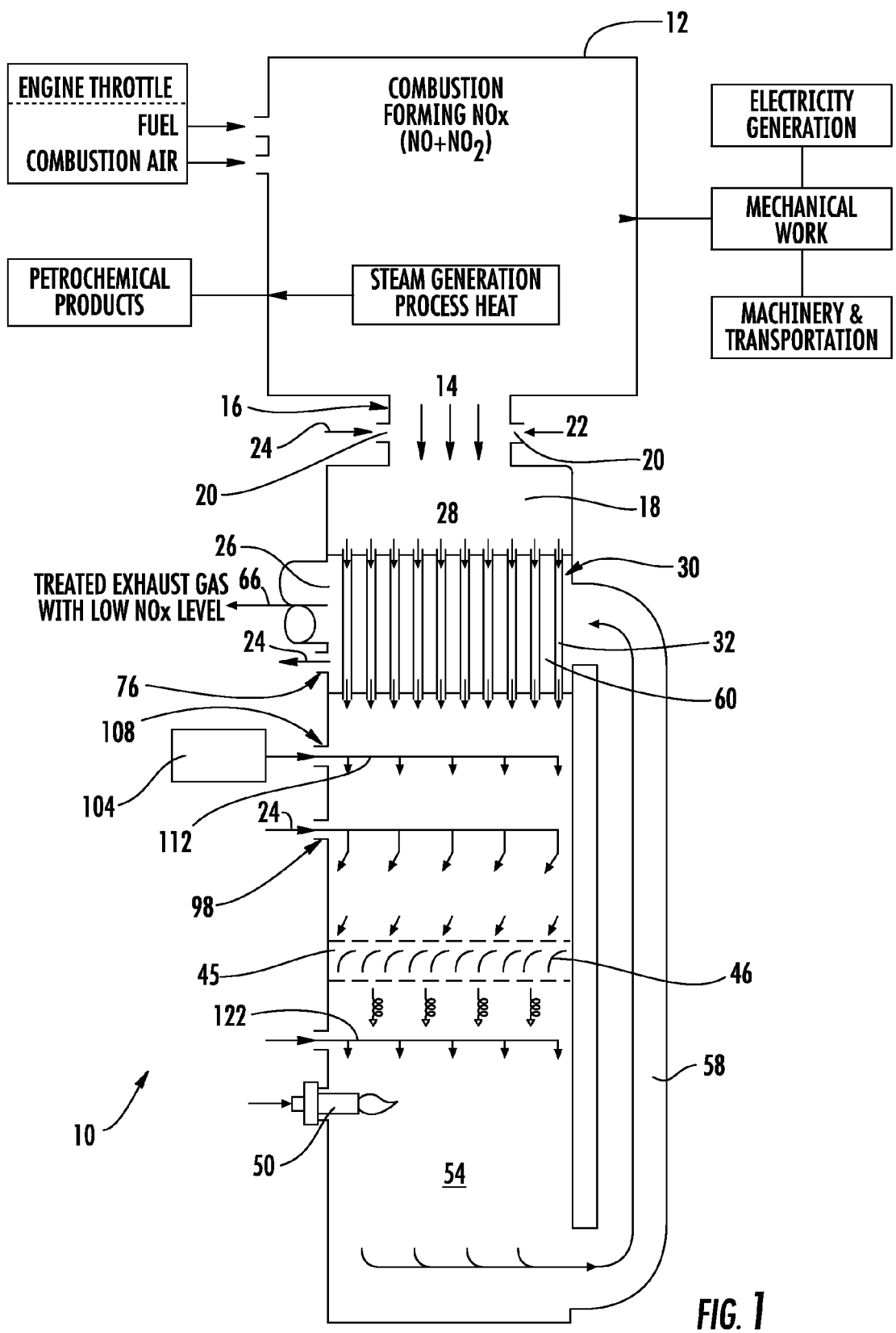
FIG. 1 is a diagrammatic view of a NOx reducing reactor apparatus constructed in accordance to the principles of the present invention; and, FIG. 2 is a diagrammatic cross sectional view of a tube shaped reactor constructed in accordance with the principles of the present invention which operates as shown in FIG. 1, and which further includes an EGR system in accordance with the principles of the present invention.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

A NOx reducing reactor apparatus constructed in accordance to the principles of the present invention is shown in the drawings and generally designated by the numeral 10. Apparatus 10 functions as an exhaust reactor as more fully described herein below to remove and/or reduce NOx, CO, carbon particulates and hydrocarbons produced by industrial processes such as an internal combustion engine 12.

Engine 12 is provided with a hydrocarbon fuel and combustion air, both of which are controlled via the engine throttle mechanism, as diagrammatically shown. As engine 12 operates in a known and customary manner it produces petrochemical products, generates electricity, operates machinery and mobile equipment, etc., and also produces exhaust gases designated by the arrows 14. The exhaust 14 is from the combustion of the fuel in the engine 12 and includes NOx, CO, carbon particulates and hydrocarbons. Exhaust 14 is captured and delivered to the reactor 10 through the exhaust pipe 16 whereat the reactor 10 treats to remove and/or reduce the NOx, CO, carbon particulates and hydrocarbons therefrom.

The exhaust 14 from the exhaust pipe 16 enters into the reactor 10 through an inlet plenum 18. One or more ports 20 are provided leading into the inlet plenum 18. Air or air enriched with $O_2$ designated by the arrow 22 is introduced into plenum 18 through port 20. Recirculated exhaust gas (EGR) designated by the arrow 24 is also introduced into plenum 18 through port 20.

Figure 2:
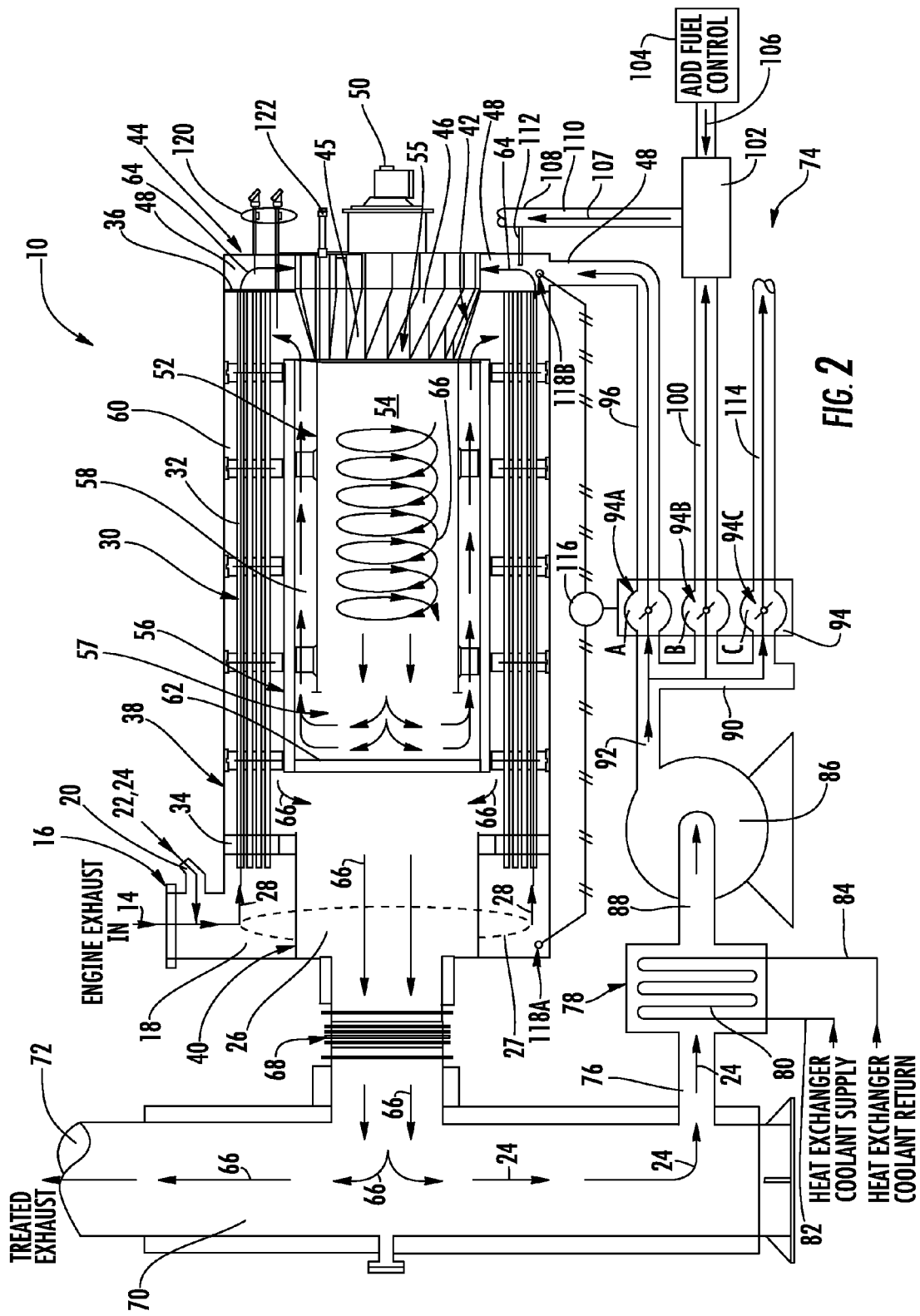

As shown in FIG. 2, plenum 18 is preferably annular shaped and surrounds the reactor cylindrical shaped outlet plenum 26. The exhaust 14, air 22 and EGR 24 travel around the outlet plenum 26, as designated by the dash lines 27, whereat they are mixed and then travel toward the heat exchanger 30 as designated by arrows 28.

Heat exchanger 30 which, as more fully described herein below, encompasses the heat exchanger, the outer shell and also the reactor shell, includes a first exchanger chamber comprising plurality of exchanger pipes 32 extending through annular walls 34, 36. Annular wall 34 extends between the reactor outer cylindrical shell 38 and the cylindrical outlet pipe 40 which defines the outlet plenum 26. Hence, the inlet plenum 18 is defined by the reactor outer shell 30, the annular wall 34 and the outlet pipe 40, and communicates with the exchanger pipes 32.

The annular wall 36 extends between the outer shell 30 and the static mixer frusto conical shell 42. A reactor end wall 44 is longitudinally spaced from the annular wall 36 and extends to the reactor shell 30. A plurality of swirl vanes 46 extend from the reactor end wall 44 into the static mixer shell 42. Hence, an end plenum 48 is defined by the annular wall 36, reactor shell 30 and the reactor end wall 44. The end plenum 38 communicates between the exchanger pipes 32 and the mixing chamber 45 which extends through the static mixer shell 42 between the swirl vanes 46. A burner 50 extends through the reactor end wall 44 and into the mixing chamber 45 through the center of the swirl vanes 46.

A center cylinder 52 extends longitudinally from the frusto conical shell 42 and defines the reaction core chamber 54 having an inlet end 55 and an outlet end 57. The reaction core chamber 54 is in communication with the mixing chamber 45.

A sandwiched cylinder 56 is located around and circumscribes the center cylinder 52, and is itself surrounded and circumscribed by the exchanger pipes 32, thereby defining an annular return chamber 58 between the center cylinder 52 and the sandwiched cylinder 56 and a second exchanger chamber/annular chamber 60 between the sandwiched cylinder 56 and the reactor outer shell 38. A disc shaped end cap 62 is provided and closes off one end of the sandwiched cylinder 56. The center cylinder 52 extends towards but short of the cap 62 and, hence, the reaction core chamber 54 communicates with the annular return chamber 58. The other end of the sandwiched cylinder 56 extends towards but short of the frusto conical shell 42 and the annular wall 36. Hence, the annular return chamber 58 communicates with the exchanger chamber 60.

The exchanger pipes 32 extend through the exchanger chamber 60 between walls 34, 36 but do not communicate therewith. The capped end 62 of cylinder 56 extends towards but short of the annular wall 34 and, hence, the exchanger chamber 60 also communicates with the outlet plenum 26.

As should now be appreciated, the mixed gases (exhaust 14, air 22 and EGR 24) designated by arrows 28 in inlet plenum 18 travel through the exchanger pipes 32 and then through the end plenum 48 as designated by arrows 64, into the mixing chamber 45. In the mixing chamber 45 and reaction core chamber 54, the burner 50 can heat the mixed gases when and/or as may be needed while the swirl vanes 46 cause the gases to be mixed as they travel through the reaction core 54 as indicated by arrows 66. The mixing indicated by arrows 66 causes more complete mixing and oxidation of the add fuel of the engine NOx, CO, carbon particulates and hydrocarbons exhaust 14. Thereafter, as also indicated by arrows (unnumbered for clarity), the exhaust gases 28 travel from the reaction core chamber 54 back through the return chamber 58, into and through the exchanger chamber 60 and around the exchanger pipes 32 whereby gases 28 traveling through the pipes 32 are heated. Finally, the treated exhaust gases designated by the arrows 66 exit from the exchanger chamber 60 and travel into the outlet plenum 26. From the outlet plenum 26, the treated exhaust gases 66 travel through the expansion coupling 68 and into the exhaust stack 70.

Most of the treated exhaust gases 66 travel out through the stack opening 72 to the atmosphere. However, some treated exhaust gas 66 is advantageously recirculated as indicated by arrows 24 via an exhaust gas recirculating (EGR) system 74 and used as EGR by the reactor 10.

EGR system 74 includes a conduit 76 whereby treated exhaust gas 66 can be drawn from the outlet plenum 26 and/or the stack 70 and delivered to a heat exchanger 78. Heat exchanger 78 includes a cooling coil 80. A coolant fluid such as water (although other known and customary fluids and/or air can also be used) is pumped through the coil 80 entering through inlet 82 and exiting through outlet 84.

An EGR injection blower 86 is connected upstream and in line with the heat exchanger 78 via a conduit 88. The outlet of blower 86 is connected to a manifold 90 through a conduit 92. Blower 86 thus draws the EGR 24 over the heat exchanger coil 80 thereby cooling the EGR and delivers it to the manifold 90.

A valve block 94 is provided upstream of the manifold 90 and includes separate valves 94A, 94B and 94C. Manifold 90 is connected to and supplies EGR to each of the valves 94A, 94B and 94C. Valve 94A is in turn connected via conduit 96 to the EGR injection grid 98 which leads to and is connected to the end plenum 48.

Valve 94B is connected via a conduit 100 to an add fuel dilution mixer 102. An add fuel control unit 104 supplies a hydrocarbon add fuel to the mixer 102 via a conduit 106. The mixed EGR and added fuel designated by the arrow 107 exits the mixer 102 and is delivered to the hydrocarbon injection grid 108 through conduit 110. The hydrocarbon injection grid 108 includes a plurality injector nozzles 112 (preferably eight nozzles are provided, although only one is shown, and conduit 110 is indicated to continue to the others for clarity) whereby the EGR and fuel mixture is injected into the end plenum 48.

Valve 94C is connected to a conduit 114 which is indicated to continue and is connected to ports 20 leading to the inlet plenum 18.

A feedback controller 116 is connected to and controls the operation of the EGR valves 94A, 94B and 94C. Heat sensors 118A and 118B are provided at respective inlet plenum 18 and hydrocarbon injection grid 98 and are each connected and provide a temperature value to the controller 116. Additional heat sensors 120 are provided in the end plenum 48 and the area between the entrance to the exchanger chamber 60 and are also connected (not shown) to the controller 116. The controller 116 is programmed to use the temperature values of the sensors 118A, 118B and 120 and selectively open and close each of the valves 94A, 94B and 94C as needed, in accordance with the principles of the present invention, to improve the operation and efficiency of the reactor 10 in the removal and/or reduction of NOx, CO, carbon particulates and hydrocarbons from the exhaust gas 14.

A reductant injection grid is provided including a plurality of reductant injectors 122 (preferably four, although only one is shown for clarity). A reductant such as urea or ammonia is injected into the end plenum 48 and/or the mixing chamber 45.

It is noted that, in operation, the burner 50 is typically used only during start up until the reactor 10 reaches its steady state temperatures. Valve 94B and the add fuel control unit 104 are operated to inject mixed EGR and added fuel 107 only for high specific BTU i.e. natural gas operations. Accordingly, systems not using high specific BTU i.e. natural gas as the add fuel will not require the flow valve 94B and the dilution mixer 102 but, rather, the ad fuel control unit 104 will be connected to and supply the hydrocarbon add fuel directly to the hydrocarbon injection grid 108.

Valve 94C is operated only during low flow operations. Accordingly, systems with sufficient flow will not require the flow valve 94C.

Structure and Function of the Reactor Apparatus and Method

The reactor apparatus and method requires the creation of a reaction zone with a controlled environment within an in-line reactor as shown in the drawings through which a combustion exhaust flows. The temperature, exhaust gas residence time in the reactor and chemical composition of the reactor are closely controlled to optimize the removal of NOx, CO, carbon particulates and hydrocarbons. A chemical reagent (preferably ammonia or urea) is injected as described into the reactor to reduce and remove NOx from the combustion exhaust being treated. A hydrocarbon fuel (add fuel) is injected as described into the reactor to maintain the operating temperature for the reactor and to generate the free radicals needed to convert an injected chemical reagent to a form specific for reaction with NOx. The add fuel and the chemical reagent are injected upstream of a static mixer to produce a homogenous mixture, in the reaction zone, with the combustion exhaust to facilitate the chemical reactions for removal of NOx, CO and Hydrocarbons from the combustion exhaust. The combustion exhaust, treated by the reactor apparatus and method, must contain a minimum of 3.0% oxygen to support the oxidation/combustion reactions required for the reactor apparatus and method to be effective. A burner as shown is installed on the (burner end) end of the reactor opposite the end (entrance) of the reactor where the combustion exhaust is introduced. The combustion exhaust is preheated for the reaction zone by passing the combustion exhaust over a tube and shell heat exchanger as shown as it flows from the reactor entrance to the burner end of the reactor or the reaction zone. A PLC controller, separate from or in addition to the add fuel controller, integrated on a closed loop basis with a gas component analyzer is used to monitor and control the operation of the reactor apparatus and method.

Operation of the Reactor Apparatus and Method

The reactor apparatus starts operating when it receives a signal from the combustion exhaust generator (IC engine or boiler). The burner is fired to preheat the incoming combustion exhaust to the autoignition temperature (temperature at which the add fuel starts oxidizing) of the add fuel (transition point). As the combustion gas increases in temperature heat is exchanged from reaction zone of the reactor to the combustion exhaust flowing from the reactor entrance to reaction zone. At the temperature transition point, injection of add fuel is initiated and the burner gradually turned off. The add fuel is used to bring the reactor and combustion gas temperature to the optimum operating temperature range, 1450-1500 deg. F., and to maintain that temperature. Injection of the chemical reagent is then begun. The PLC/gas component analyzer continuously controls all of the critical operating parameters (temperature, reagent injection, etc.) to produce the desired level of emissions removal.

Reaction Chemistry

The removal of emissions from combustion exhausts by the subject process is driven by a complex free radical chain. The critical components of these reactions are: Add Fuel Partial Oxidation and Moist CO oxidation mechanism to generate OH free radicals. Generation of Reducing Radicals using OH to react with the injected chemical reagents (preferably ammonia and urea) to produce highly active chemical species that react specifically with NOx. Gas Phase NO Reduction using the active chemical species from the Generation of Reducing Radicals to reduce and remove NOx from the combustion gas being treated. Gas Phase NOx Partial oxidation of the add fuel, using methane as an example, proceeds according to these reactions $CH_4+OH \rightarrow CH_3+H_2O \rightarrow CH_3+O_2 \rightarrow HCHO+OH \rightarrow HCHO+OH \rightarrow HCO+H_2O \rightarrow HCO+O_2 \rightarrow CO+HO_2$. The Moist CO Oxidation Mechanism proceeds according to these reactions: $CO+OH \rightarrow CO_2+H \rightarrow H+O_2 \rightarrow OH+O \rightarrow O+H_2O \rightarrow OH+OH$. The thermal decomposition of Urea produces the following species urea $\rightarrow HNCO+NH_3$ and ammonia exists as $NH_3$ in the gas phase. Using the species from urea and ammonia Generation of Reducing Radicals using OH from the Moist CO Oxidation Mechanism proceeds according to the following reactions: $HNCO+OH \rightarrow NCO+H_2O$ and/or $HNCO+OH \rightarrow NH_2+CO_2$ and/or $NH_3+OH \rightarrow NH_2+H_2O$. The Gas-Phase NO Reduction of NOx proceeds according to the following reactions: $NH_2+No \rightarrow N_2+H_2O$ and/or $NCO+NOx \rightarrow N_2+CO_2$.

Reactor Apparatus and Method Enhancements and Improvements from the Prior Art The reactor apparatus and method proposes improvements and enhancements to the apparatus and method of Sudduth et al., U.S. Pat. No. 5,985,222. By using exhaust gas recirculation, the operating range of the prior systems to combustion exhausts containing 3% or greater O2 to combustion exhausts containing less than 3.0% O2. This improvement extends the range of applications for the prior systems to many additional combustion sources. Specifically EGR enhances and improves the ability of the prior systems to remove NOx from combustion exhausts containing less than 0.5% $O_2$ by modifying the combustion kinetics of added fuels by injecting or recycling exhaust gas (EGR) that has already been treated into the untreated exhaust gas before and/or as it enters a reactor to be treated by the process. EGR is also used to permit the use of high specific BTU fuels as add fuels extending its range of applications. The use of EGR is implemented by its injection into and mixed with the process add fuel to reduce its energy content to about 250-500 $BTU/FT^3$ to reduce the combustion kinetics of the add fuel before it enters reactor and subsequently improve NOx removal. The injection of air into the combustion exhaust and/or EGR entering the reactor before treatment by the reactor is also required to allow treatment of combustion exhausts containing less than 3.% $O_2$ to provide the $O_2$ needed to drive the combustion based process for removal of NOx.

A further improvement is to optimize NOx removal from the untreated combustion exhaust by optimizing mixing of the injected chemical and the add fuel by controlling the flow of gases through the static mixer in the reactor by injecting EGR into the reactor.

An additional improvement is reducing the time needed to reach the temperature required (1450-1500 F°) for startup or reaction initiation time for removal of NOx from the combustion exhaust being treated by injecting EGR (untreated combustion exhaust) into the untreated combustion exhaust entering the reactor or injecting EGR into the reactor section containing the untreated combustion exhaust. The injected EGR allows the reactor to be heated more rapidly by preheating the untreated combustion exhaust and through total flow control (combustion exhaust+EGR) into the reactor allowing the reactor burner to be fired at a higher level for heating the gases flowing through the reactor.

A further improvement is to optimize NOx removal from the untreated combustion exhaust by using a gas analyzer and a programmed ladder logic (PLC) feedback loop control system to control the operating parameters to enhance and optimize the removal of NOx from the untreated combustion exhaust. The operating parameters controlled by the PLC are: % $O_2$ and ratio $O_2$/% CO in the treated exhaust, the injection rates for the add fuel, reducing chemical (NH3 or Urea), EGR injection flow rates/temperatures and air injection flow rates. The % $O_2$, CO and NOx in the untreated combustion gas must also be measured along with temperatures at strategic areas to protect and optimize its removal of NOx and for safety.

Novel Aspects and Improvements of the Reactor Apparatus and Method

A. A method for extending the ability of prior systems to remove NOx from combustion exhausts containing a minimum of 3% $O_2$ to combustion exhausts containing less than 3.0% $O_2$ that extends that extends the range of applications to many additional combustion sources.

B. The method described in paragraph A above extending the ability of prior systems to remove NOx from combustion exhausts containing less than 3.0% $O_2$ by modifying the combustion kinetics of added fuels by injecting or recycling exhaust gas (EGR) that has already been treated into the untreated exhaust gas before and/or as it enters a reactor to be treated by the process.

C. The method of paragraphs A and B above wherein EGR is also used to permit the use of high specific BTU fuels as add fuels for the process extending its range of applications. The use of EGR is implemented by its injection into and mixed with the process add fuel to reduce its energy content to about 250-500 BTU/FT$^3$ to reduce the combustion kinetics of the add fuel before it enters the reactor and subsequently improve NOx removal.

D. The method described in paragraph A above wherein air is injected into the combustion exhaust and/or EGR entering the reactor or before treatment by the reactor to provide the $O_2$ needed to drive the combustion based process for removal of NOx.

E. A method for optimizing NOx removal from the untreated combustion exhaust by optimizing mixing of the injected chemical and the add fuel by controlling the flow of gases through the static mixer in the reactor by injecting EGR into the reactor up stream of the reaction zone for removal of NOx.

F. A method for reducing the time needed to reach the temperature required (1450-1500 F°) for startup or reaction initiation time for removal of NOx from the combustion exhaust being treated by injecting EGR (untreated combustion exhaust) into the untreated combustion exhaust entering the reactor or injecting EGR into the reactor section containing the untreated combustion exhaust. The injected EGR allows the reactor to be heated more rapidly by preheating the untreated combustion exhaust and through total flow control into the reactor allowing the reactor burner to be fired at a higher level for heating the gases flowing through the reactor.

G. A method for using a gas analyzer and a programmed ladder logic (PLC) feedback loop control system to control the operating parameters to enhance and optimize the removal of NOx from the untreated combustion exhaust. The operating parameters controlled by the PLC are: % O2 and O2/CO ratio in the treated exhaust, the injection rates for the add fuel, flow rate of reducing chemical (NH3 or Urea), EGR injection flow rates/temperatures and air injection flow rates. The % O2, CO and NOx in the untreated combustion gas must also be measured along with temperatures at strategic areas to protect and optimize its removal of NOx and for safety.

While this invention has been described as having an exemplary design, the present invention may be further modified within the spirit and scope of this disclosure. This application is therefore intended to cover any variations, uses, or adaptations of the invention using its general principles.

What is claimed is:

1. An apparatus for treating exhaust gases produced by industrial processes and removing or reducing NOx, CO, carbon particulates and hydrocarbons therefrom, said apparatus comprising:
    a reactor including: an inlet plenum receiving the exhaust gases; a reaction chamber wherein a reaction takes place for treating the exhaust gases; an outlet plenum receiving the treated exhaust gases; a heat exchanger including a first exchanger chamber between the inlet plenum and the reaction chamber and a second exchanger chamber between an exit from the reaction chamber and the outlet plenum; wherein exhaust gases exiting the reaction chamber and traveling through the second exchanger chamber and to the outlet plenum are used to heat the exhaust gases traveling from the inlet plenum through the first exchanger chamber and entering the reaction chamber; and,
    wherein treated exhaust gas is recirculated from the outlet plenum to the reaction chamber.

2. The apparatus of claim 1 wherein an injection blower is provided between the outlet plenum and the reaction chamber whereby treated exhaust gas is recirculated from the outlet plenum and is injected into the reaction chamber.

3. The apparatus of claim 2 further comprising a first flow valve between the injection blower and the reaction chamber.

4. The apparatus of claim 3 further comprising:
    a feedback controller;
    a heat sensor connected to the feedback controller and providing an input temperature value to the controller of the exhaust gases in the outlet plenum;

a heat sensor connected to the feedback controller and providing an input temperature value to the controller of the recirculated exhaust gases being injected into the reaction chamber; and, wherein the feedback controller in connected to and controls the first flow valve in response to the input temperatures values.

5. The apparatus of claim 4 further comprising a cooling heat exchanger between the outlet plenum and the injection blower for cooling the treated exhaust gas being recirculated from the outlet plenum to the reaction chamber.

6. The apparatus of claim 2 further comprising:
a first flow valve between the injection blower and the reaction chamber;
an add fuel dilution mixer between the injection blower and the reaction chamber;
an add fuel control unit providing hydrocarbon add fuel to the add fuel dilution mixer, whereby mixed recirculated exhaust gases and add fuel is injected into the reaction chamber;
a second flow control valve between the injection blower and the add fuel dilution mixer;
a third flow valve between the injection blower and the inlet plenum whereby treated exhaust gas is recirculated from the outlet plenum and is injected into the inlet plenum;
a feedback controller;
a heat sensor connected to the feedback controller and providing an input temperature value to the controller of the exhaust gases in the outlet plenum;
a heat sensor connected to the feedback controller and providing an input temperature value to the controller of the recirculated exhaust gases entering the reaction chamber;
wherein the feedback controller in connected to and controls the first, second and third flow valves in response to the input temperatures values; and,
a cooling heat exchanger between the outlet plenum and the injection blower for cooling the treated exhaust gas being recirculated from the outlet plenum to the input plenum.

7. The apparatus of claim 2 further comprising:
an add fuel dilution mixer between the injection blower and the reaction chamber; and,
an add fuel control unit providing hydrocarbon add fuel to the add fuel dilution mixer, whereby mixed recirculated exhaust gases and add fuel is injected into the reaction chamber.

8. The apparatus of claim 7 further comprising a second flow control valve between the injection blower and the add fuel dilution mixer.

9. The apparatus of claim 8 further comprising:
a feedback controller;
a heat sensor connected to the feedback controller and providing an input temperature value to the controller of the exhaust gases in the outlet plenum;
a heat sensor connected to the feedback controller and providing an input temperature value to the controller of the recirculated exhaust gases being injected into the reaction chamber; and,
wherein the feedback controller in connected to and controls the second flow valve in response to the input temperatures values.

10. The apparatus of claim 9 further comprising a cooling heat exchanger between the outlet plenum and the injection blower for cooling the treated exhaust gas being recirculated from the outlet plenum to the reaction chamber.

11. The apparatus of claim 1 further comprising a cooling heat exchanger for cooling the treated exhaust gas being recirculated from the outlet plenum to the reaction chamber.

12. The apparatus of claim 1 further comprising a cooling heat exchanger between the outlet plenum and the injection blower for cooling the treated exhaust gas being recirculated from the outlet plenum to the reaction chamber.

13. The apparatus of claim 1 wherein an injection blower is provided between the outlet plenum and the inlet plenum whereby treated exhaust gas is recirculated from the outlet plenum and is injected into the inlet plenum.

14. The apparatus of claim 13 further comprising a third flow valve between the injection blower and the inlet plenum.

15. The apparatus of claim 14 further comprising:
a feedback controller;
a heat sensor connected to the feedback controller and providing an input temperature value to the controller of the exhaust gases in the outlet plenum;
a heat sensor connected to the feedback controller and providing an input temperature value to the controller of the recirculated exhaust gases entering the reaction chamber; and,
wherein the feedback controller in connected to and controls the third flow valve in response to the input temperatures values.

16. The apparatus of claim 15 further comprising a cooling heat exchanger between the outlet plenum and the injection blower for cooling the treated exhaust gas being recirculated from the outlet plenum to the input plenum.

17. The apparatus of claim 1 wherein:
a mixing chamber comprising a plurality of swirl vanes is provided between the heat exchanger first chamber and a reaction chamber entrance;
a reductant is injected into the mixing chamber; and,
a burner selectively provides heat through the mixing chamber and into the reaction chamber.

18. The apparatus of claim 17 wherein an injection blower is provided between the outlet plenum and the reaction chamber whereby treated exhaust gas is recirculated from the outlet plenum and is injected into the reaction chamber.

19. The apparatus of claim 18 further comprising:
a first flow valve between the injection blower and the reaction chamber;
a feedback controller;
a heat sensor connected to the feedback controller and providing an input temperature value to the controller of the exhaust gases in the outlet plenum;
a heat sensor connected to the feedback controller and providing an input temperature value to the controller of the recirculated exhaust gases being injected into the reaction chamber;
wherein the feedback controller in connected to and controls the first flow valve in response to the input temperatures values; and,
a cooling heat exchanger between the outlet plenum and the injection blower for cooling the treated exhaust gas being recirculated from the outlet plenum to the reaction chamber.

20. The apparatus of claim 18 further comprising:
an add fuel dilution mixer between the injection blower and the reaction chamber,
an add fuel control unit providing hydrocarbon add fuel to the add fuel dilution mixer, whereby mixed recirculated exhaust gases and add fuel is injected into the reaction chamber;

a second flow control valve between the injection blower and the add fuel dilution mixer;
a feedback controller;
a heat sensor connected to the feedback controller and providing an input temperature value to the controller of the exhaust gases in the outlet plenum;
a heat sensor connected to the feedback controller and providing an input temperature value to the controller of the recirculated exhaust gases being injected into the reaction chamber;
wherein the feedback controller in connected to and controls the second flow valve in response to the input temperatures values; and,
a cooling heat exchanger between the outlet plenum and the injection blower for cooling the treated exhaust gas being recirculated from the outlet plenum to the reaction chamber.

21. The apparatus of claim 18 wherein an injection blower is provided between the outlet plenum and the inlet plenum whereby treated exhaust gas is recirculated from the outlet plenum and is injected into the inlet plenum, and further comprising:
a third flow valve between the injection blower and the inlet plenum;
a feedback controller;
a heat sensor connected to the feedback controller and providing an input temperature value to the controller of the exhaust gases in the outlet plenum;
a heat sensor connected to the feedback controller and providing an input temperature value to the controller of the recirculated exhaust gases entering the reaction chamber;
wherein the feedback controller in connected to and controls the third flow valve in response to the input temperatures values; and,
a cooling heat exchanger between the outlet plenum and the injection blower for cooling the treated exhaust gas being recirculated from the outlet plenum to the input plenum.

22. The apparatus of claim 18 further comprising:
a first flow valve between the injection blower and the reaction chamber;
an add fuel dilution mixer between the injection blower and the reaction chamber;
an add fuel control unit providing hydrocarbon add fuel to the add fuel dilution mixer, whereby mixed recirculated exhaust gases and add fuel is injected into the reaction chamber;
a second flow control valve between the injection blower and the add fuel dilution mixer;
a third flow valve between the injection blower and the inlet plenum whereby treated exhaust gas is recirculated from the outlet plenum and is injected into the inlet plenum;
a feedback controller;
a heat sensor connected to the feedback controller and providing an input temperature value to the controller of the exhaust gases in the outlet plenum;
a heat sensor connected to the feedback controller and providing an input temperature value to the controller of the recirculated exhaust gases entering the reaction chamber;
wherein the feedback controller in connected to and controls the first, second and third flow valves in response to the input temperatures values; and,
a cooling heat exchanger between the outlet plenum and the injection blower for cooling the treated exhaust gas being recirculated from the outlet plenum to the input plenum.

* * * * *